United States Patent
Harada et al.

(10) Patent No.: US 9,145,482 B2
(45) Date of Patent: Sep. 29, 2015

(54) CARBON BLACK, METHOD FOR PRODUCING CARBON BLACK, AND RUBBER COMPOSITION

(75) Inventors: Ryusuke Harada, Tokyo (JP); Takeshi Akahane, Tokyo (JP)

(73) Assignee: TOKAI CARBON CO., LTD., Tokyo (JP)

( * ) Notice: Subject to any disclaimer, the term of this patent is extended or adjusted under 35 U.S.C. 154(b) by 514 days.

(21) Appl. No.: 13/576,449

(22) PCT Filed: Feb. 1, 2011

(86) PCT No.: PCT/JP2011/051981
§ 371 (c)(1),
(2), (4) Date: Oct. 17, 2012

(87) PCT Pub. No.: WO2011/096378
PCT Pub. Date: Aug. 11, 2011

(65) Prior Publication Data
US 2013/0030108 A1    Jan. 31, 2013

(30) Foreign Application Priority Data
Feb. 5, 2010   (JP) ................................. 2010-024055

(51) Int. Cl.
C09C 1/48 (2006.01)
C08L 21/00 (2006.01)
C08K 3/04 (2006.01)
B82Y 30/00 (2011.01)

(52) U.S. Cl.
CPC . C08K 3/04 (2013.01); B82Y 30/00 (2013.01); C09C 1/48 (2013.01); C01P 2004/64 (2013.01); C01P 2006/12 (2013.01); C01P 2006/19 (2013.01); Y10T 428/2982 (2015.01)

(58) Field of Classification Search
CPC ............ B82Y 30/00; C08K 3/04; C09C 1/48; C01P 2004/64; C01P 2006/12; C01P 2006/19; Y10T 428/2982
USPC ......... 524/496; 423/449.1; 428/402; 977/773
See application file for complete search history.

(56) References Cited

U.S. PATENT DOCUMENTS 6,121,346 A *  9/2000  Visel et al. ..................... 523/200
6,348,181 B1 *  2/2002  Morgan ...................... 423/449.1
2007/0197715 A1  8/2007  Yanagioka

FOREIGN PATENT DOCUMENTS

| | | |
|---|---|---|
| JP | 61-066759 A | 4/1986 |
| JP | 3-068666 A | 3/1991 |
| JP | 3-146568 A | 6/1991 |
| JP | 3-200158 A | 9/1991 |
| JP | 4-178470 A | 6/1992 |
| JP | 5-043817 A | 2/1993 |
| JP | 8-169983 A | 7/1996 |
| JP | 9-087542 A | 3/1997 |
| JP | 2000-355662 A | 12/2000 |
| JP | 2001-247721 A | 9/2001 |
| JP | 2002-188022 A | 7/2002 |
| JP | 2004-026973 A | 1/2004 |
| JP | 2004-277443 A | 10/2004 |
| JP | 2005-272729 A | 10/2005 |
| JP | 2005-307172 A | 11/2005 |

OTHER PUBLICATIONS

Japanese Office Action dated Mar. 5, 2014, issued in corresponding Japanese Patent Application No. 2010-024055, w/English translation (9 pages).
International Search Report of PCT/JP2011/051981; mailing date Apr. 26, 2011.
Chinese Office Action dated Nov. 12, 2013 issued in corresponding Chinese Application No. 201180008334.8, with English Translation. (7 pages).
Asahi Carbon Co., Ltd., Website document, http://www.asahicarbon.co.jp/global_site/product/technology/cb_colloidal.html and http://www.asahicarbon.co.jp/global_site/product/technology/cb_physics.html.†

* cited by examiner
† cited by third party

*Primary Examiner* — Ling Choi
*Assistant Examiner* — Chun-Cheng Wang
(74) *Attorney, Agent, or Firm* — Westerman, Hattori, Daniels & Adrian, LLP

(57) ABSTRACT

Carbon black includes primary particles having an average particle size of 15 to 40 nm, microprotrusions having an average length of 2 to 10 nm being formed on a surface of the primary particles. A method for producing carbon black includes introducing an oxygen-containing gas and fuel into a fuel combustion zone, mixing and combusting the oxygen-containing gas and the fuel to produce a high-temperature combusted gas stream, introducing a raw material hydrocarbon in a first stage of a raw material introduction zone and introducing the raw material hydrocarbon and an oxygen-containing gas in a second stage of the raw material introduction zone while introducing the high-temperature combusted gas stream into the raw material introduction zone to produce a carbon black-containing gas which is introduced into a reaction termination zone while spraying a coolant.

6 Claims, 3 Drawing Sheets

(a)

(b)

(a)

(b)

CARBON BLACK, METHOD FOR PRODUCING CARBON BLACK, AND RUBBER COMPOSITION

TECHNICAL FIELD

The invention relates to carbon black, a method for producing carbon black, and a rubber composition.

BACKGROUND ART

Various types of carbon black that differ in properties have been used for rubber reinforcement applications. Since the properties of the carbon black are major factors that determine the performance of the resulting rubber, carbon black having properties suitable for the target application is selected, and added to a rubber composition.

For example, high-structure hard carbon black having a small particle size and a large specific surface area (e.g., SAF (N110) or ISAF (N220)) has been used for a rubber member (e.g., tire tread) for which high abrasion resistance is required. However, a rubber obtained using a rubber composition that includes carbon black is highly reinforced, and exhibits high abrasion resistance, but tends to exhibit high heat buildup and low impact resilience.

In recent years, development of fuel-efficient tires has been increasingly desired in order to address a social need for saving resources and energy, and a rubber composition that achieves low heat buildup and high resilience suitable for fuel-efficient tires has been extensively developed. Low heat buildup and high resilience have been normally achieved by adding carbon black having a large particle size and a small specific surface area to a rubber composition.

A rubber that is highly reinforced, and exhibits excellent abrasion resistance, low heat buildup, and high resilience is required to produce the tread of fuel-efficient tires. However, since carbon black that is used to improve the degree of reinforcement and abrasion resistance and carbon black that is used to improve heat buildup and resilience completely differ in particle size and specific surface area and have a trade-off relationship, it is difficult to obtain the desired rubber composition by adjusting the particle size and the specific surface area of the carbon black.

In order to deal with the above problem, technology has been proposed that improves rubber properties (e.g., degree of reinforcement, abrasion resistance, heat generation property, and impact resilience) by microscopically evaluating the colloidal properties of carbon black in addition to the particle size, specific surface area, structure, and the like (that have been regarded as important as the basic properties of carbon black used for rubber reinforcement applications), and adding carbon black that has specific properties to a rubber component (see Patent Document 1 (W-A-2002-188022) and Patent Document 2 (JP-A-8-169983), for example).

RELATED-ART DOCUMENT

Patent Document

Patent Document 1: JP-A-2002-188022
Patent Document 2: JP-A-8-169983

SUMMARY OF THE INVENTION

Technical Problem

In view of the above situation, an object of the invention is to provide novel carbon black that can improve rubber properties (e.g., degree of reinforcement, abrasion resistance, heat buildup, and impact resilience), a method that conveniently produces the carbon black, and a rubber composition that can improve rubber properties (e.g., degree of reinforcement, abrasion resistance, heat buildup, and impact resilience).

Solution to Problem

The inventors of the invention conducted extensive studies in order to achieve the above object, and found that the above object can be achieved by producing carbon black that includes primary particles having an average particle size of 15 to 40 nm, microprotrusions having an average length of 2 to 10 nm being formed on the surface of the primary particles, using a method that produces carbon black using a reactor that includes a fuel combustion zone, a raw material introduction zone, and a reaction termination zone that are arranged in this order in the downstream direction from the upstream side of a gas passage, and includes: introducing an oxygen-containing gas and fuel into the fuel combustion zone, and mixing and combusting the oxygen-containing gas and the fuel to produce a high-temperature combusted gas stream; introducing a raw material hydrocarbon in a first stage of the raw material introduction zone, and introducing the raw material hydrocarbon and an oxygen-containing gas in a second stage of the raw material introduction zone while introducing the high-temperature combusted gas stream into the raw material introduction zone to effect reactions in this order to produce a carbon black-containing gas; and introducing the carbon black-containing gas into the reaction termination zone while spraying a coolant into the carbon black-containing gas. This finding has led to the completion of the invention.

Specifically, several aspects of the invention provide the following.

(1) Carbon black including primary particles having an average particle size of 15 to 40 nm, microprotrusions having an average length of 2 to 10 nm being formed on a surface of the primary particles.

(2) The carbon black according to (1), the carbon black having a DBP absorption of 40 to 150 ml/100 g and a specific surface area by nitrogen adsorption of 50 to 150 $m^2/g$.

(3) A method for producing carbon black that produces carbon black using a reactor that includes a fuel combustion zone, a raw material introduction zone, and a reaction termination zone that are arranged in this order in a downstream direction from an upstream side of a gas passage, the method including:

introducing an oxygen-containing gas and fuel into the fuel combustion zone, and mixing and combusting the oxygen-containing gas and the fuel to produce a high-temperature combusted gas stream;

introducing a raw material hydrocarbon in a first stage of the raw material introduction zone, and introducing the raw material hydrocarbon and an oxygen-containing gas in a second stage of the raw material introduction zone while introducing the high-temperature combusted gas stream into the raw material introduction zone to effect reactions in this order to produce a carbon black-containing gas; and introducing the carbon black-containing gas into the reaction termination zone while spraying a coolant into the carbon black-containing gas.

(4) The method according to (3), wherein the raw material hydrocarbon and the oxygen-containing gas are introduced in the second stage of the raw material introduction zone using a twin-fluid nozzle.

(5) A rubber composition including 100 parts by mass of a rubber component, and 20 to 150 parts by mass of the carbon black according to (1) or (2), or carbon black obtained by the method according to (3) or (4).

Advantageous Effects of the Invention

The invention thus provides carbon black that ensures that a rubber obtained using a rubber composition that includes the carbon black is highly reinforced, and exhibits improved abrasion resistance, low heat buildup, and improved impact resilience.

The invention thus provides a method that conveniently produces the carbon black.

The invention thus also provides a rubber composition that improves rubber properties (e.g., degree of reinforcement, abrasion resistance, heat buildup, and impact resilience).

DESCRIPTION OF EMBODIMENTS

Carbon Black

Figure 1:
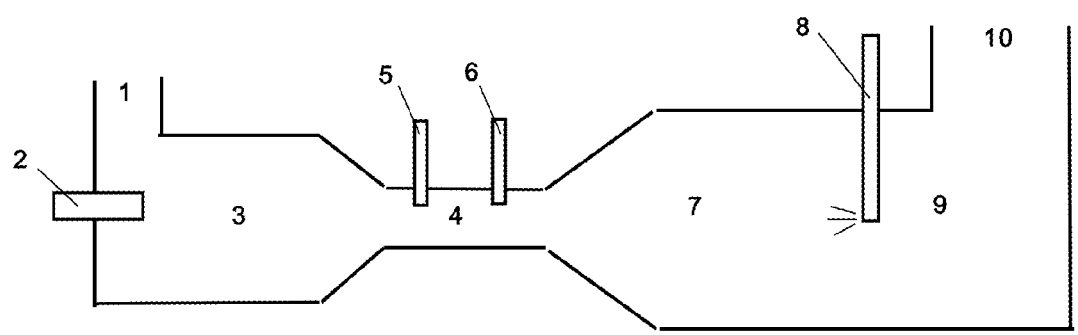
FIG. 1 is a schematic cross-sectional view illustrating a reactor used to produce carbon black according to one embodiment of the invention.

Carbon black according to one embodiment of the invention is described below.

The carbon black according to one embodiment of the invention includes primary particles having an average particle size of 15 to 40 nm, microprotrusions having an average length of 2 to 10 nm being formed on a surface of the primary particles.

The carbon black according to one embodiment of the invention includes the primary particles.

Carbon black has a complex structure in which primary particles (i.e., spherical carbon primary particles) aggregate and branch in an irregular chain-like manner. The minimum unit of the aggregate structure is referred to as "aggregate".

The average particle size of the primary particles that form the carbon black according to one embodiment of the invention is 15 to 40 nm, preferably 18 to 38 nm, and more preferably 21 to 35 nm.

When the average particle size of the primary particles that form the carbon black according to one embodiment of the invention is 15 to 40 nm, a rubber obtained using a rubber composition that includes the carbon black exhibits low heat buildup and high resilience. If the average particle size of the primary particles is less than 15 nm (i.e., the primary particles that form the carbon black are very small), a rubber obtained using a rubber composition that includes the carbon black may exhibit high heat buildup. If the average particle size of the primary particles exceeds 40 nm, a rubber obtained using a rubber composition that includes the carbon black may not be sufficiently reinforced (in particular, may exhibit low abrasion resistance).

Note that the term "average particle size" of the primary particles used herein refers to the average value of the particle sizes of one thousand primary particles measured using a transmission electron microscope, and refers to the average particle size of the spherical primary particles excluding the microprotrusions formed on the surface thereof.

The microprotrusions having an average length of 2 to 10 nm are formed on the surface of the primary particles that form the carbon black according to one embodiment of the invention.

The average length of the microprotrusions is preferably 3 to 9 nm, and more preferably 4 to 8 nm.

When the average length of the microprotrusions is 2 to 10 nm, a rubber obtained using a rubber composition that includes the carbon black is highly reinforced since the carbon black is sufficiently physically caught by the rubber component. Moreover, since a situation in which the carbon black falls off from the rubber component is suppressed, it is possible to provide the resulting rubber with the desired abrasion resistance. When the carbon black is physically caught by the rubber component, the carbon black does not easily move (i.e., friction between the carbon black particles is reduced) even if load is repeatedly applied to the rubber. Therefore, generation of heat due to internal friction can be suppressed.

If the average length of the microprotrusions is less than 2 nm, a rubber obtained using a rubber composition that includes the carbon black may not be sufficiently reinforced since the carbon black may not be sufficiently caught by the rubber component. If the average length of the microprotrusions exceeds 10 nm, the effect of improving the degree of reinforcement of the rubber due to the carbon black caught by the rubber component may not be obtained due to a decrease in the difference between the length of the microprotrusions and the particle size of the primary particles.

Note that the term "average length" of the microprotrusions used herein refers to the average value of the lengths of three hundred microprotrusions measured using a transmission electron microscope.

When the average particle size of the primary particles that form the carbon black according to one embodiment of the invention is 15 to 40 nm, a rubber obtained using a rubber composition that includes the carbon black exhibits low heat buildup and high resilience. When the microprotrusions having an average length of 2 to 10 nm are formed on the surface of the primary particles, a rubber obtained using a rubber composition that includes the carbon black can be reinforced, and exhibits abrasion resistance and low heat buildup.

It may be possible to add carbon black having a large particle size and carbon black having a small particle size to a rubber composition so that the resulting rubber exhibits low heat buildup and high resilience due to the carbon black having a large particle size, and is reinforced and provided with abrasion resistance due to the carbon black having a small particle size. However, the inventors found that the resulting rubber is not sufficiently reinforced, and does not exhibit sufficient abrasion resistance and low heat buildup when using carbon black having a large particle size and carbon black having a small particle size since the carbon black is not caught by the rubber component. When using carbon black having a particle size of less than 10 nm as the carbon black having a small particle size, since it is difficult to produce such carbon black, it is difficult to industrially apply the above method.

It is preferable that the carbon black according to one embodiment of the invention have a DBP absorption of 40 to 150 ml/100 g, more preferably 50 to 140 ml/100 g, and still more preferably 60 to 130 ml/100 g.

If the DBP absorption of the carbon black is less than 40 ml/100 g, a rubber obtained using a rubber composition that includes the carbon black may not be sufficiently reinforced. If the DBP absorption of the carbon black exceeds 150 ml/100 g, the processability of a rubber composition that includes the carbon black may deteriorate.

Note that the twit "DBP absorption" used herein refers to a value measured in accordance with "Carbon black for rubber industry—Fundamental characteristics—Part 4: Determination of DBP absorption" specified in JIS K 6217-4.

It is preferable that the carbon black according to one embodiment of the invention have a specific surface area by nitrogen adsorption of 50 to 150 $m^2/g$, more preferably 60 to 140 $m^2/g$, and still more preferably 70 to 130 $m^2/g$.

If the specific surface area by nitrogen adsorption of the carbon black is less than 50 $m^2/g$, a rubber obtained using a rubber composition that includes the carbon black may not be sufficiently reinforced. If the specific surface area by nitrogen adsorption of the carbon black exceeds 150 $m^2/g$, a rubber obtained using a rubber composition that includes the carbon black may exhibit high heat buildup.

Note that the term "specific surface area by nitrogen adsorption" used herein refers to a value measured in accordance with "Carbon black for rubber industry—Fundamental characteristics—Part 2: Determination of specific surface area—Nitrogen adsorption methods—Single-point procedures" specified in JIS K 6217-2.

When using the carbon black according to one embodiment of the invention as a component of a rubber composition, the resulting rubber is highly reinforced, and exhibits improved abrasion resistance, low heat buildup, and improved impact resilience. The carbon black according to one embodiment of the invention may suitably be used as a component of a tire tread rubber composition.

The carbon black according to one embodiment of the invention may be produced by the following method for producing carbon black according to one embodiment of the invention.

Method for Producing Carbon Black

The method for producing carbon black according to one embodiment of the invention is described below.

The method for producing carbon black according to one embodiment of the invention produces carbon black using a reactor that includes a fuel combustion zone, a raw material introduction zone, and a reaction termination zone that are arranged in this order in the downstream direction from the upstream side of a gas passage, and includes: introducing an oxygen-containing gas and fuel into the fuel combustion zone, and mixing and combusting the oxygen-containing gas and the fuel to produce a high-temperature combusted gas stream; introducing a raw material hydrocarbon in a first stage of the raw material introduction zone, and introducing the raw material hydrocarbon and an oxygen-containing gas in a second stage of the raw material introduction zone while introducing the high-temperature combusted gas stream into the raw material introduction zone to effect reactions in this order to produce a carbon black-containing gas; and introducing the carbon black-containing gas into the reaction termination zone while spraying a coolant into the carbon black-containing gas.

The method for producing carbon black according to one embodiment of the invention may be implemented using a large-diameter cylindrical reactor illustrated in FIG. 1, for example. Note that FIG. 1 schematically illustrates the cross-sectional shape of the large-diameter cylindrical reactor.

The details of the method for producing carbon black according to one embodiment of the invention are described below appropriately taking the reactor illustrated in FIG. 1 as an example.

The reactor illustrated in FIG. 1 includes a fuel combustion zone 3, a raw material introduction zone 4, a reaction zone 7, and a reaction termination zone 9 that communicate with each other and are arranged in this order in the downstream direction from the upstream side of a gas passage formed inside the reactor.

The fuel combustion zone 3 included in the reactor illustrated in FIG. 1 includes an oxygen-containing gas inlet 1 through which an oxygen-containing gas (e.g., air) is introduced in the direction perpendicular to the axial direction of the reactor, and a combustion burner 2 that feeds fuel in the axial direction of the reactor. The raw material introduction zone 4 includes a first-stage raw material introduction nozzle 5 that feeds a raw material hydrocarbon in the direction perpendicular to the axial direction of the reactor, and a second-stage raw material introduction nozzle 6 that feeds a raw material hydrocarbon and an oxygen-containing gas in the direction perpendicular to the axial direction of the reactor, and is provided to coaxially communicate with the fuel combustion zone 3. The reaction zone 7 is provided to coaxially communicate with the raw material introduction zone 4. The reaction termination zone 9 includes a cooling unit 8 that feeds a coolant in the direction perpendicular to the axial direction of the reactor, and is provided to coaxially communicate with the reaction zone 7.

The reactor illustrated in FIG. 1 has a hand drum-like narrowed shape so that the diameter of the reactor decreases from the fuel combustion zone 3 toward the raw material introduction zone 4, and increases from the raw material introduction zone 4 toward the reaction section 7. Note that the shape of the reactor is not limited thereto. The reactor may have an arbitrary shape.

The method for producing carbon black according to one embodiment of the invention includes introducing the oxygen-containing gas and the fuel into the fuel combustion zone 3, and mixing and combusting the oxygen-containing gas and the fuel to produce a high-temperature combusted gas stream.

Examples of the oxygen-containing gas include gas that contains oxygen, air, or a mixture thereof. Examples of the fuel include hydrogen, carbon monoxide, natural gas, oil gas, petroleum-derived liquid fuel such as FCC residual oil and heavy oil, and coal-derived liquid fuel such as creosote oil.

The oxygen-containing gas is preferably fed to the fuel combustion zone 3 at a flow rate of 2000 to 5000 $Nm^3/h$, more preferably 2500 to 4500 $Nm^3/h$, and still more preferably 3000 to 4000 $Nm^3/h$. The fuel is preferably fed to the fuel combustion zone 3 at a flow rate of 50 to 400 kg/h, more preferably 100 to 300 kg/h, and still more preferably 150 to 200 kg/h.

The oxygen-containing gas and the fuel may be mixed and combusted in the fuel combustion zone 3 to produce a high-temperature combusted gas stream by feeding the fuel while feeding the oxygen-containing gas that is preheated to 400 to 500° C., for example.

The method for producing carbon black according to one embodiment of the invention includes introducing the raw material hydrocarbon in the first stage of the raw material introduction zone 4, and introducing the raw material hydrocarbon and the oxygen-containing gas in the second stage of the raw material introduction zone 4 while introducing the high-temperature combusted gas stream into the raw material introduction zone 4.

Examples of the raw material hydrocarbon fed to the first stage and the second stage of the raw material introduction zone 4 include aromatic hydrocarbons such as benzene, toluene, xylene, naphthalene, and anthracene, coal-derived hydrocarbons such as creosote oil and carboxylic acid oil, petroleum-derived heavy oils such as ethylene heavy end oil and FCC residual oil, acetylene-based unsaturated hydrocarbons, ethylene-based hydrocarbons, aliphatic unsaturated hydrocarbons such as pentane and hexane, and the like. Examples of the oxygen-containing gas fed to the second stage of the raw material introduction zone 4 include those mentioned above in connection with the oxygen-containing gas introduced into the fuel combustion zone.

The raw material hydrocarbon is preferably fed to the first stage and the second stage of the raw material introduction zone so that the raw material hydrocarbon fed to the second stage of the raw material introduction zone accounts for 35 mass % or less, more preferably 10 to 35 mass %, and still more preferably 20 to 35 mass %, of the total amount of the raw material hydrocarbon.

When the raw material hydrocarbon fed to the second stage of the raw material introduction zone accounts for 35 mass % or less of the total amount of the raw material hydrocarbon, the particle size of the primary particles of the carbon black can be controlled within the desired range, and a rubber obtained using a rubber composition that includes the carbon black is reinforced to the desired extent.

The ratio (flow rate of oxygen-containing gas/weight of raw material hydrocarbon) of the flow rate of the oxygen-containing gas to a specific weight of the raw material hydrocarbon fed to the second stage of the raw material introduction zone 4 is preferably 0.5 ($Nm^3/h$)/1 (kg/h) to 4 ($Nm^3/h$)/1 (kg/h), more preferably 1 ($Nm^3/h$)/1 (kg/h) to 3.5 ($Nm^3/h$)/1 (kg/h), and still more preferably 1.5 ($Nm^3/h$)/1 (kg/h) to 3 ($Nm^3/h$)/1 (kg/h).

When using the reactor illustrated in FIG. 1, the raw material hydrocarbon is fed from the first-stage raw material introduction nozzle 5, and the raw material hydrocarbon and the oxygen-containing gas are simultaneously fed from the second-stage raw material introduction nozzle 6.

The method for producing carbon black according to one embodiment of the invention may utilize a single-fluid nozzle as the first-stage raw material introduction nozzle, and may utilize a twin-fluid nozzle as the second-stage raw material introduction nozzle. It is preferable to use a nozzle that can spray droplets having a particle size of about 10 to 100 as the twin-fluid nozzle.

According to the method for producing carbon black according to one embodiment of the invention, the raw material hydrocarbon is separately fed in two stages, and the oxygen-containing gas is fed in the second stage together with the raw material hydrocarbon. If the total amount of the raw material hydrocarbon is fed in a single stage, the heat of the high-temperature combusted gas stream that is fed to the raw material introduction zone is used to produce spherical primary particles of carbon black, and the quantity of heat inside the reactor decreases rapidly. This makes it impossible to form primary particles having microprotrusions formed on the surface thereof. Even if the raw material hydrocarbon is separately fed in two stages, since heat is used to produce spherical primary particles of carbon black in the first stage, the quantity of heat inside the reactor decreases in the second stage. This also makes it impossible to form primary particles having microprotrusions formed on the surface thereof. In contrast, it is possible to form primary particles in the first stage, and efficiently atomize the raw material hydrocarbon (i.e., form microdroplets of the raw material hydrocarbon) in the second stage to form a local high-temperature zone via combustion by introducing the raw material hydrocarbon in the first stage of the raw material introduction zone, and introducing the raw material hydrocarbon and the oxygen-containing gas in the second stage of the raw material introduction zone. It is considered that carbon black fine particles are produced by the microdroplets, and bonded (fused) to the surface of the primary particles of the carbon black produced in the first stage to form microprotrusions. The primary particles having the microprotrusions then aggregate to obtain carbon black that includes the primary particles having the microprotrusions on the surface thereof.

When the method for producing carbon black according to one embodiment of the invention utilizes the reactor illustrated in FIG. 1, the carbon black-containing gas produced in the raw material introduction zone 4 may be introduced into the reaction zone 7, and sufficiently reacted in the reaction zone 7. Note that the method for producing carbon black according to one embodiment of the invention may utilize a reactor that does not include the reaction zone 7.

The method for producing carbon black according to one embodiment of the invention includes introducing the carbon black-containing gas into the reaction termination zone while spraying the coolant.

Examples of the coolant include water and the like. The carbon black particles that are suspended in the high-temperature combusted gas are cooled by spraying the coolant. The coolant may be sprayed using the cooling unit illustrated in FIG. 1, for example.

The cooled carbon black particles are separated and collected using a separation/collection emit (e.g., cyclone or bag filter) through a flue 10 (see FIG. 1) and the like to collect the target carbon black.

Carbon black similar to that described in detail above in connection with the carbon black according to one embodiment of the invention may be obtained by the method for producing carbon black according to one embodiment of the invention.

The average particle size of the primary particles that form the carbon black obtained by the method for producing carbon black according to one embodiment of the invention may be controlled by adjusting the amount of the oxygen-containing gas introduced into the fuel combustion zone, or adjusting the amount of the raw material hydrocarbon that is fed in the first stage of the raw material introduction zone relative to the total amount of the raw material hydrocarbon introduced into the raw material introduction zone.

The average length of the microprotrusions formed on the surface of the primary particles that form the carbon black obtained by the method for producing carbon black according to one embodiment of the invention may be controlled by adjusting the amount of the raw material hydrocarbon that is fed in the second stage of the raw material introduction zone relative to the total amount of the raw material hydrocarbon introduced into the raw material introduction zone, or adjusting the amount of the oxygen-containing gas that is fed in the second stage of the raw material introduction zone.

The DBP absorption of the carbon black obtained by the method for producing carbon black according to one embodiment of the invention may be controlled by mixing an alkali metal salt into the fuel while adjusting the amount of the alkali metal salt. More specifically, the DBP absorption of the resulting carbon black may be controlled by feeding the alkali metal salt from the combustion burner 2 (see FIG. 1) together with the fuel. Potassium carbonate ($K_2CO_3$) is preferable as the alkali metal salt.

The specific surface area by nitrogen adsorption of the carbon black obtained by the method for producing carbon black according to one embodiment of the invention may be controlled by adjusting the amount of the oxygen-containing gas introduced into the fuel combustion zone, or adjusting the amount of the raw material hydrocarbon that is fed in the first stage of the raw material introduction zone relative to the total amount of the raw material hydrocarbon introduced into the raw material introduction zone.

The method for producing carbon black according to one embodiment of the invention can conveniently produce carbon black that ensures that a rubber obtained using a rubber composition that includes the carbon black is highly reinforced, and exhibits improved abrasion resistance, low heat buildup, and improved impact resilience.

Rubber Composition

A rubber composition according to one embodiment of the invention is described below.

The rubber composition according to one embodiment of the invention includes 100 parts by mass of a rubber component, and 20 to 150 parts by mass of the carbon black according to one embodiment of the invention, or carbon black obtained by the method for producing carbon black according to one embodiment of the invention.

The rubber component included in the rubber composition according to one embodiment of the invention may be at least one rubber component selected from natural rubber and diene rubbers such as styrene-butadiene rubber, polybutadiene rubber, isoprene rubber, butyl rubber, chloroprene rubber, and an acrylonitrile-butadiene copolymer rubber, for example.

The rubber composition according to one embodiment of the invention includes the carbon black according to one embodiment of the invention, or carbon black obtained by the method for producing carbon black according to one embodiment of the invention. The details of the carbon black included in the rubber composition are the same as described above.

The rubber composition according to one embodiment of the invention includes 100 parts by mass of the rubber component, and 20 to 150 parts by mass, preferably 30 to 100 parts by mass, and more preferably 40 to 80 parts by mass, of the carbon black according to one embodiment of the invention, or carbon black obtained by the method for producing carbon black according to one embodiment of the invention.

When the rubber composition according to one embodiment of the invention includes 100 parts by mass of the rubber component, and 20 to 150 parts by mass of the carbon black according to one embodiment of the invention, or carbon black obtained by the method for producing carbon black according to one embodiment of the invention, a rubber obtained using the rubber composition is highly reinforced, and exhibits excellent abrasion resistance, low heat buildup, excellent impact resilience, and the like.

The rubber composition according to one embodiment of the invention may include an inorganic reinforcing material in addition to the rubber component and the carbon black.

The inorganic reinforcing material may be one or more inorganic reinforcing materials selected from dry silica, wet silica (hydrated silicic acid or precipitated silica), aluminum hydroxide, calcium carbonate, clay, magnesium hydroxide, talc, mica, composites thereof with carbon black, and the like.

The inorganic reinforcing material is preferably used in an amount of 20 to 150 parts by mass, more preferably 30 to 100 parts by mass, and still more preferably 40 to 80 parts by mass, based on 100 parts by mass of the rubber component.

When the rubber composition according to one embodiment of the invention includes the inorganic reinforcing material in an amount of 20 to 150 parts by mass based on 100 parts by mass of the rubber component, it is possible to improve the production efficiency by suppressing an increase in viscosity when preparing the rubber composition, and efficiently reinforce the resulting rubber while efficiently reducing the heat buildup of the rubber.

When the rubber composition according to one embodiment of the invention includes silica as the inorganic reinforcing material, the rubber composition may further include a silane coupling agent. The silane coupling agent is preferably used in an amount of 3 to 20 parts by mass based on 100 parts by mass of the inorganic reinforcing material. When the silane coupling agent is used in an amount within the above range, it is possible to improve the dispersibility of the inorganic reinforcing material in the rubber composition, and sufficiently improve the reinforcement capability of the inorganic reinforcing material.

The rubber composition according to one embodiment of the invention may include a commonly-used optional component such as a vulcanizing agent, a vulcanization accelerator, an aging preventive, a vulcanization aid, a softener, or a plasticizer.

The rubber composition according to one embodiment of the invention may be obtained by kneading the rubber component, the desired amount of the carbon black, and the desired amount of an optional component (e.g., inorganic reinforcing material, silane coupling agent, vulcanizing agent, vulcanization accelerator, aging preventive, vulcanization aid, softener, or plasticizer). The components may be kneaded using a known kneader (e.g., mixer or mill).

The rubber composition according to one embodiment of the invention may be appropriately cured by heating the rubber composition at 130 to 180° C. to obtain the desired rubber.

Since a rubber obtained using the rubber composition according to one embodiment of the invention is highly reinforced, and exhibits improved abrasion resistance, low heat buildup, improved impact resilience, and the like, and the the degree of reinforcement and the heat buildup are improved in a well-balanced manner, the rubber composition according to one embodiment of the invention may suitably be used as a tire tread rubber composition.

EXAMPLES

The invention is further described below by way of examples. Note that the invention is not limited to the following examples.

Example 1

Production of Carbon Black

Carbon black was produced using the reactor illustrated in FIG. 1 that has an approximately cylindrical shape.

The reactor illustrated in FIG. 1 includes the fuel combustion zone 3, the raw material introduction zone 4, the reaction zone 7, and the reaction termination zone 9 that communicate with each other and are arranged in this order in the downstream direction from the upstream side of the gas passage formed inside the reactor.

The fuel combustion zone 3 (inner diameter: 500 mm, length: 1200 mm) included in the reactor illustrated in FIG. 1 includes the oxygen-containing gas inlet 1 through which an oxygen-containing gas (e.g., air) is introduced in the direction perpendicular to the axial direction of the reactor, and the combustion burner 2 that feeds fuel in the axial direction of the reactor. The raw material introduction zone 4 (inner diameter: 200 mm, length: 700 mm) includes the first-stage raw material introduction nozzle 5 (single-fluid nozzle) that feeds a raw material hydrocarbon in the direction perpendicular to the axial direction of the reactor, and the second-stage raw material introduction nozzle 6 (twin-fluid nozzle (e.g., "Air Atomizing Nozzle 1/4JBC" manufactured by Spraying Systems)) that feeds a raw material hydrocarbon and air in the direction perpendicular to the axial direction of the reactor, and is provided to coaxially communicate with the fuel combustion zone 3. The reaction zone 7 (inner diameter: 700 mm, length: 10,000 mm) is provided to coaxially communicate with the raw material introduction zone 4. The reaction termination zone 9 includes the cooling unit 8 (water-cooling quenching unit) that feeds cooling water in the direction perpendicular to the axial direction of the reactor, and can be changed in position in the vertical direction, and is provided to coaxially communicate with the reaction zone 7.

As illustrated in FIG. 1, the reactor has a hand drum-like narrowed shape so that the diameter of the reactor gradually decreases from the fuel combustion zone 3 toward the raw material introduction zone 4, and increases from the raw material introduction zone 4 toward the reaction section 7 in a tapered shape.

The second-stage raw material introduction nozzle 6 (twin-fluid nozzle) provided in the raw material introduction zone 4 can spray droplets having a particle size of about 10 to 100 μm.

In the fuel combustion zone 3, air (preheated to 450° C., flow rate: 2820 Nm$^3$/h) was fed through the oxygen-containing gas inlet 1, and FCC residual oil (petroleum-based residual oil) having the properties shown in Table 1 (flow rate: 183 kg/h), fuel atomization air (flow rate: 380 Nm$^3$/h), and potassium carbonate ($K_2CO_3$) ($K^+$ ion flow rate: 700 g/h) were simultaneously fed from the combustion burner 2, which were mixed and combusted to produce a high-temperature combusted gas stream flowing in the axial direction of the reactor.

Creosote oil having the properties shown in Table 1 was fed from the first-stage raw material introduction nozzle 5 (single-fluid nozzle) at a flow rate of 950 kg/h, and creosote oil having the properties shown in Table 1 and air were simultaneously fed from the second-stage raw material introduction nozzle 6 (twin-fluid nozzle) at a flow rate of 150 kg/h and 423 Nm$^3$/h, respectively, while introducing the high-temperature combusted gas stream into the raw material introduction zone 4. The raw materials were sequentially reacted to produce a carbon black-containing gas.

The carbon black-containing gas produced in the raw material introduction zone 4 was introduced into the reaction zone 7, sufficiently reacted, and introduced into the reaction termination zone 9 while spraying cooling water from the cooling unit 8. The cooled carbon black particles were collected using a separation/collection unit (not illustrated in FIG. 1) through the flue 10 (see FIG. 1) and the like to collect the target carbon black.

TABLE 1

|  | Properties of fuel | Properties of raw material hydrocarbon |
|---|---|---|
| Specific gravity (15/4° C.) | 1.027 | 1.107 |
| Toluene insoluble content (%) | 0.01 | 0.05 |
| Correlation coefficient (BMCI) | 111 | 155 |
| Sulfur (%) | 0.09 | 0.39 |
| Initial boiling point (° C.) | 136 | 216 |
| Na$^+$ (ppm) | 1.8 | 10.1 |
| K$^+$ (ppm) | 0.7 | 0.4 |

The total combustion rate that indicates the ratio of the air feed rate to the total feed rate of the raw material oil and the fuel oil in the reactor was calculated using the following expression.

Note that the term "total air feed rate" in the expression refers to the sum of the feed rate (flow rate) of air fed to the fuel combustion zone (feed rate of combustion air+feed rate of fuel atomization air) and the feed rate of air fed to the raw material introduction zone (i.e., the total feed rate of air fed to the reactor). The term "raw material feed rate" in the expression refers to the total feed rate (flow rate) of the raw material fed to the reactor (i.e., the total feed rate of the raw material fed in the first stage and the second stage of the raw material introduction zone).

Total combustion rate (%) {total air feed rate (Nm$^3$/h)/ (raw material feed rate (kg/h)+fuel feed rate (kg/h))×10}×100

Table 2 shows the total combustion rate together with the feed rate of air fed to the fuel combustion zone (feed rate of combustion air+feed rate of fuel atomization air), the fuel feed rate, the first-stage raw material feed rate (i.e., the feed rate of the raw material fed in the first stage of the raw material introduction zone), the second-stage raw material feed rate (i.e., the feed rate of the raw material fed in the second stage of the raw material introduction zone), and the second-stage air feed rate (i.e., the feed rate of air fed in the second stage of the raw material introduction zone).

Figure 2:
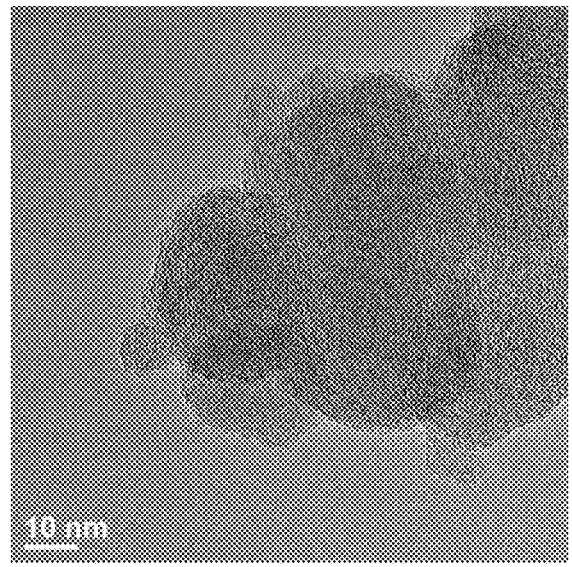
FIGS. 2(a) and (b) are views illustrating carbon black obtained in Example 1.
Figure 2:
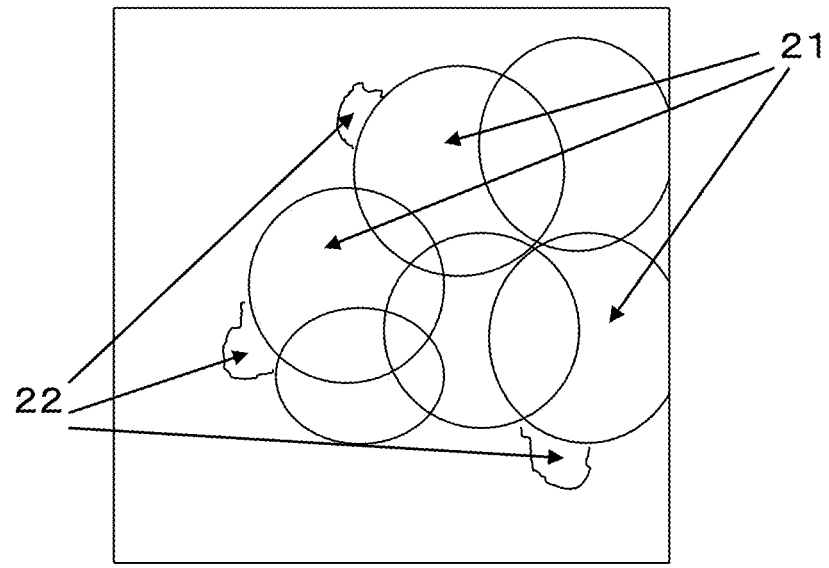

The resulting carbon black was observed using a transmission electron microscope ("JEM-2000FX" manufactured by JEOL Ltd.). FIG. 2(a) illustrates the resulting electron micrograph, and FIG. 2(b) illustrates the details of the electron micrograph illustrated in FIGS. 2(a). As illustrated in FIGS. 2(a) and 2(b), the resulting carbon black was formed of spherical primary particles 21, and microprotrusions 22 were formed on the surface of the spherical primary particles 21.

The average particle size of the primary particles forming the carbon black was 28 nm, and the average length of the microprotrusions formed on the surface of the primary particles was 6 nm (calculated by observation using the transmission electron microscope).

The DBP absorption of the resulting carbon black was measured in accordance with "Carbon black for rubber industry—Fundamental characteristics—Part 4: Determination of DBP absorption" specified in JIS K 6217-4, and the specific surface area by nitrogen adsorption of the resulting carbon black was measured in accordance with "Carbon black for rubber industry—Fundamental characteristics—Part 2: Determination of specific surface area—Nitrogen adsorption methods—Single-point procedures" specified in JIS K 6217-2. The results are shown in Table 2.

Examples 2 to 4

Production of Carbon Black

Carbon black was produced in the same manner as in Example 1, except that the first-stage raw material feed rate and the second-stage raw material feed rate were changed as shown in Table 2. In Examples 3 and 4, potassium carbonate ($K_2CO_3$) was not fed to the fuel combustion zone 3 from the combustion burner 2.

The total combustion rate in each example was calculated in the same manner as in Example 1. Table 2 shows the total combustion rate together with the feed rate of air fed to the fuel combustion zone (feed rate of combustion air+feed rate of fuel atomization air), the fuel feed rate, the first-stage raw material feed rate, the second-stage raw material feed rate, and the second-stage air feed rate.

The resulting carbon black was observed using a transmission electron microscope ("JEM-2000FX" manufactured by JEOL Ltd.). It was found that the resulting carbon black was formed of primary particles, and microprotrusions were formed on the surface of the primary particles in the same manner as the carbon black obtained in Example 1.

Table 2 shows the average particle size of the primary particles forming the carbon black, and the average length of the microprotrusions formed on the surface of the primary particles (calculated by observation using the transmission electron microscope).

The DBP absorption and the specific surface area by nitrogen adsorption of the resulting carbon black were measured in the same manner as in Example 1. The results are shown in Table 2.

TABLE 2

| | | Example 1 | Example 2 | Example 3 | Example 4 |
|---|---|---|---|---|---|
| Fuel combustion zone | Air feed rate (Nm³/h) (feed rate of combustion air + feed rate of fuel atomization air) | 3200 | 3200 | 3200 | 3200 |
| | Fuel feed rate (kg/h) | 183 | 183 | 183 | 183 |
| | Feed rate of combustion air (Nm³/h) | 380 | 380 | 380 | 380 |
| | K⁺ ion feed rate (g/h) | 700 | 750 | 0 | 0 |
| Raw material introduction zone | First-stage raw material feed rate (kg/h) | 950 | 800 | 800 | 650 |
| | Second-stage raw material feed rate (kg/h) | 150 | 150 | 300 | 300 |
| | Second-stage air feed rate (Nm³/h) | 423 | 423 | 423 | 423 |
| | Total combustion rate (%) | 28.2 | 32.0 | 28.2 | 32.0 |
| | Microprotrusions | Formed | Formed | Formed | Formed |
| | Average particle size of primary particles (nm) | 28 | 24 | 25 | 22 |
| | Average length of microprotrusions (nm) | 6 | 7 | 8 | 8 |
| | DBP absorption (ml/100 g) | 60 | 57 | 131 | 139 |
| | Specifc surface area by nitrogen adsorption (Nm³/g) | 90 | 102 | 100 | 114 |

Comparative Examples 1 to 4

Production of Carbon Black

Carbon black was produced in the same manner as in Example 1, except that the first-stage raw material feed rate and the second-stage raw material feed rate were changed as shown in Table 2, and air was not fed in the second stage of the raw material introduction zone. In Comparative Example 3, potassium carbonate ($K_2CO_3$) was not fed to the fuel combustion zone 3.

The total combustion rate in each example was calculated in the same manner as in Example 1. Table 3 shows the total combustion rate, the feed rate of air fed to the fuel combustion zone (feed rate of combustion air+feed rate of fuel atomization air), the fuel feed rate, the first-stage raw material feed rate, the second-stage raw material feed rate, and the second-stage air feed rate.

The resulting carbon black was observed using a transmission electron microscope ("JEM-2000FX" manufactured by JEOL Ltd.).

Figure 3:
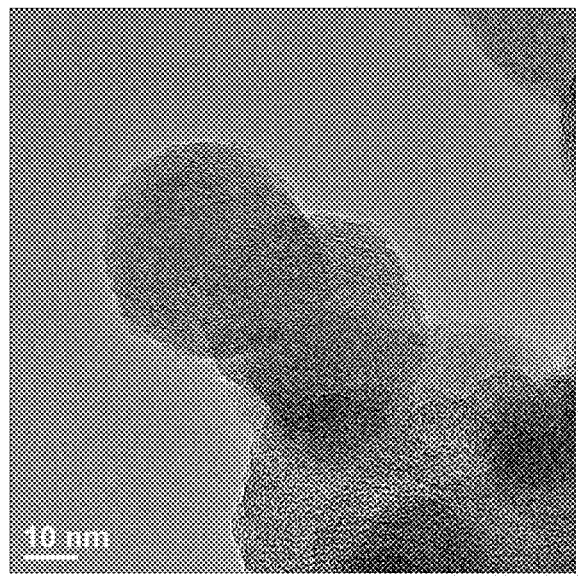
FIGS. 3(a) and (b) are views illustrating carbon black obtained in Comparative Example 1.
Figure 3:
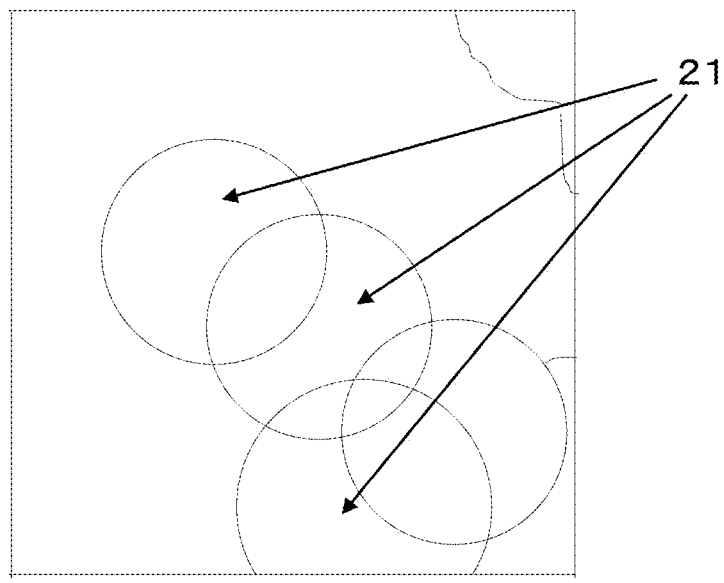

FIG. 3(*a*) illustrates an electron micrograph of the carbon black obtained in Comparative Example 1, and FIG. 3(*b*) illustrates the details of the electron micrograph illustrated in FIG. 3(*a*). As illustrated in FIGS. 3(*a*) and 3(*b*), the carbon black obtained in Comparative Example 1 was formed of spherical primary particles 21, but microprotrusions were not formed on the surface of the primary particles.

It was also confirmed that microprotrusions were not formed on the surface of the primary particles forming the carbon black obtained in Comparative Examples 2 to 4.

Table 3 shows the average particle size of the primary particles forming the carbon black (calculated by observation using the transmission electron microscope).

The DBP absorption and the specific surface area by nitrogen adsorption of the resulting carbon black were measured in the same manner as in Example 1. The results are shown in Table 3.

TABLE 3

| | | Comparative Example 1 | Comparative Example 2 | Comparative Example 3 | Comparative Example 4 |
|---|---|---|---|---|---|
| Fuel combustion zone | Air feed rate (Nm³/h) (feed rate of combustion air + feed rate of fuel atomization air) | 3200 | 3200 | 3200 | 3200 |
| | Fuel feed rate (kg/h) | 183 | 183 | 183 | 183 |
| | Feed rate of combustion air (Nm³/h) | 380 | 380 | 380 | 380 |
| | K⁺ ion feed rate (g/h) | 700 | 650 | 0 | 50 |
| Raw material introduction zone | First-stage raw material feed rate (kg/h) | 1100 | 950 | 950 | 800 |
| | Second-stage raw material feed rate (kg/h) | 0 | 0 | 150 | 150 |
| | Second-stage air feed rate (Nm³/h) | 0 | 0 | 0 | 0 |
| | Total combustion rate (%) | 24.9 | 32.0 | 24.9 | 28.2 |
| | Microprotrusions | Not formed | Not formed | Not formed | Not formed |
| | Average particle size of primary particles (nm) | 28 | 27 | 29 | 27 |
| | Average length of microprotrusions (nm) | — | — | — | — |
| | DBP absorption (ml/100 g) | 61 | 75 | 127 | 119 |
| | Specific surface area by nitrogen adsorption (Nm³/g) | 75 | 83 | 69 | 75 |

As is clear from the comparison between the results of Examples 1 to 4 and the results of Comparative Examples 1 to 4 (see Tables 1 and 2), it was confirmed that carbon black formed of primary particles having microprotrusions formed on the surface thereof was produced by feeding the raw material hydrocarbon in the first stage of the raw material introduction zone, and feeding the raw material hydrocarbon and the oxygen-containing gas in the second stage of the raw material introduction zone.

As is clear from the comparison between the results of Example 1 and the results of Comparative Example 2, or the comparison between the results of Example 3 and the results of Comparative Example 4 (see Tables 1 and 2), it was confirmed that whether or not the microprotrusions were formed was determined depending on the raw material feeding method rather than the total combustion rate (i.e., the oil/air ratio in the reactor).

The specific surface area by nitrogen adsorption of the carbon black obtained in Examples 1 to 4 was larger than the specific surface area by nitrogen adsorption of the carbon black obtained in Comparative Examples 1 to 4 (see Tables 1 and 2).

Example 5

Preparation of Rubber Composition 70 parts by mass of the carbon black obtained in Example 1, 80 parts by mass of styrene-butadiene rubber ("Nipol NS116R" manufactured by Zeon Corporation) (rubber component), 20 parts by mass of polybutadiene rubber ("JSR BR01" manufactured by JSR Corporation) (rubber component), 2 parts by mass of stearic acid, 30 parts by mass of oil ("Sonic X140" manufactured by Kyodo Oil Co., Ltd.), and 3 parts by mass of zinc oxide were kneaded for 4 minutes using an internal mixer ("MIXTRON BB-2" manufactured by Kobe Steel, Ltd.). After the addition of 2 parts by mass of a vulcanization accelerator ("Accel CZ" manufactured by Kawaguchi Chemical Industry Co., Ltd.) and 2 parts by mass of sulfur, the mixture was kneaded using open rolls to obtain a rubber composition having the composition shown in Table 4.

TABLE 4

| Component | Parts by mass |
|---|---|
| Carbon black | 70 |
| Styrene-butadiene rubber | 80 |
| Polybutadiene rubber | 20 |
| Oil | 30 |
| Stearic acid | 2 |
| Zinc oxide | 3 |
| Vulcanization accelerator | 2 |
| Sulfur | 2 |

The rubber composition was vulcanized at 160° C. for 20 minutes using a mold having dimensions of 15×15×0.2 cm to obtain a vulcanized rubber. The rubber composition was also vulcanized at 160° C. for 20 minutes using a mold having dimensions of 6.3×33×0.5 cm to obtain a vulcanized rubber for testing the abrasion rate.

The abrasion rate, the loss factor (tan δ), and the tensile strength of the resulting vulcanized rubber were measured by the following methods. The results are shown in Table 5.

Abrasion Rate

The abrasion rate (ml/5 min) was measured under the following conditions using a Lambourn abrasion tester (mechanical slip mechanism). Note that a low abrasion rate indicates excellent abrasion resistance.
Specimen: thickness: 5 mm, outer diameter: 48 mm
Emery wheel: GC type, grain size: #80, hardness: H
Carborundum powder: grain size: #80, feed rate: about 9 g/min
Relative slip rate of surface of emery wheel and specimen: 18%
Rotational speed of specimen: 480 rpm
Test load: 3 kg Loss Factor (tan δ)

The loss factor (tan δ) was measured under the following conditions using a viscoelastic spectrometer ("VR-7110" manufactured by Ueshima Seisakusho Co., Ltd.).
A small loss factor (tan δ) (at 60° C.) indicates low heat buildup.
Specimen: thickness: 2 mm, length: 35 mm, width: 5 mm
Frequency: 50 Hz
Dynamic strain rate: 1.2%
Measurement temperature: 60° C.

Tensile Stress

The tensile stress (MPa) was measured using a system "Strograph AR" (manufactured by Toyo Seiki Seisaku-Sho, Ltd.) (specimen: JIS No. 3 specimen, tensile rate: 500±25 min/min).

Examples 6 to 8 and Comparative Examples 5 to 8

Preparation of Rubber Composition

A rubber composition was prepared in the same manner as in Example 5, except for using the carbon black obtained in Example 2, the carbon black obtained in Example 3, the carbon black obtained in Example 4, the carbon black obtained in Comparative Example 1, the carbon black obtained in Comparative Example 2, the carbon black obtained in Comparative Example 3, or the carbon black obtained in Comparative Example 4, respectively.

The resulting rubber composition was vulcanized in the same manner as in Example 5 to obtain a vulcanized rubber. The wear rate, the loss factor (tan δ), and the tensile stress of the resulting vulcanized rubber were measured in the same manner as in Example 5. The results are shown in Tables 5 and 6.

Note that Table 5 shows the ratio (%) relative to the value (100%) of Comparative Example 5, and shows the measured value in parentheses, and Table 6 shows the ratio (%) relative to the value (100%) of Comparative Example 7, and shows the measured value in parentheses. The abrasion rate, the loss factor (tan δ), or the tensile strength was considered to be improved when the value shown in Tables 5 and 6 was improved by 5% or more.

TABLE 5

| | Comparative Example 5 | Comparative Example 6 | Example 5 | Example 6 |
|---|---|---|---|---|
| Abrasion rate | 100 (0.251) | 86 (0.216) | 88 (0.222) | 80 (0.201) |
| Loss factor (tan δ) | 100 (0.255) | 121 (0.308) | 79 (0.202) | 87 (0.223) |
| Tensile strength (300%) | 100 (4.2) | 133 (5.6) | 133 (5.6) | 145 (6.1) |

Note:
Table 5 shows the ratio (%) relative to the value (100%) of Comparative Example 5 (the measured value is indicated in parentheses).
The unit for the abrasion rate is "ml/5 min", and the unit for the tensile strength is "MPa".

TABLE 6

| | Comparative Example 7 | Comparative Example 8 | Example 7 | Example 8 |
|---|---|---|---|---|
| Abrasion rate | 100 (0.124) | 102 (0.127) | 94 (0.117) | 92 (0.114) |
| Loss factor (tan δ) | 100 (0.299) | 194 (0.311) | 79 (0.236) | 84 (0.252) |
| Tensile strength (300%) | 100 (11.5) | 97 (11.1) | 113 (13.0) | 104 (12.0) |

Note:
Table 6 shows the ratio (%) relative to the value (100%) of Comparative Example 7 (the measured value is indicated in parentheses).
The unit for the abrasion rate is "ml/5 min", and the unit for the tensile strength is "MPa".

As shown in Tables 5 and 6, the rubber compositions obtained in Examples 5 to 8 produced a rubber that generally had a low abrasion rate, a small loss factor (tan δ), and a high tensile strength as compared with the rubber compositions obtained in Comparative Examples 5 to 8. It was thus confirmed that a rubber that is highly reinforced, and exhibits excellent abrasion resistance, low heat buildup, and high resilience can be obtained using the rubber compositions obtained in Examples 5 to 8.

INDUSTRIAL APPLICABILITY

The invention thus provides carbon black that ensures that a rubber obtained using a rubber composition that includes the carbon black is highly reinforced, and exhibits improved abrasion resistance, low heat buildup, and improved impact resilience.

The invention thus provides a method that can conveniently produce the carbon black.

The invention thus also provides a rubber composition that improves rubber properties (e.g., degree of reinforcement, abrasion resistance, heat buildup, and impact resilience).

REFERENCE SIGNS LIST

1 Oxygen-containing gas inlet
2 Combustion burner
3 Fuel combustion zone
4 Raw material introduction zone
5 First-stage raw material introduction nozzle
6 Second-stage raw material introduction nozzle
7 Reaction zone
8 Cooling unit
9 Reaction termination zone
10 Flue
21 Primary particle
22 Microprotrusion

The invention claimed is:

1. Carbon black comprising primary particles having an average particle size of 15 to 40 nm, and microprotrusions produced by carbon black fine particles being fused to the surface of the primary particles having an average length of 2 to 10 nm.

2. The carbon black according to claim 1, the carbon black having a DBP absorption of 40 to 150 ml/100 g and a specific surface area by nitrogen adsorption of 50 to 150 $m^2/g$.

3. A method for producing carbon black that produces carbon black using a reactor that includes a fuel combustion zone, a raw material introduction zone, and a reaction termination zone that are arranged in this order in a downstream direction from an upstream side of a gas passage, the method comprising:
introducing an oxygen-containing gas and fuel into the fuel combustion zone, and mixing and combusting the oxygen-containing gas and the fuel to produce a high-temperature combusted gas stream;
introducing a raw material hydrocarbon in a first stage of the raw material introduction zone, and introducing the raw material hydrocarbon and an oxygen-containing gas in a second stage of the raw material introduction zone while introducing the high-temperature combusted gas stream into the raw material introduction zone to effect reactions in this order to produce a carbon black-containing gas; and
introducing the carbon black-containing gas into the reaction termination zone while spraying a coolant into the carbon black-containing gas;
wherein a ratio of flow rate of the oxygen-containing gas to a specific weight of the raw material hydrocarbon fed to the second stage is between 0.5 ($Nm^3/h$)/1 (kg/h) to 4 ($Nm^3/h$)/1 (kg/h).

4. The method according to claim 3, wherein the raw material hydrocarbon and the oxygen-containing gas are introduced in the second stage of the raw material introduction zone using a twin-fluid nozzle.

5. A rubber composition comprising 100 parts by mass of a rubber component, and 20 to 150 parts by mass of the carbon black according to claim 1.

6. A rubber composition comprising 100 parts by mass of a rubber component, and 20 to 150 parts by mass of the carbon black according to claim 2.

* * * * *